US012224676B2

(12) United States Patent
Shen et al.

(10) Patent No.: US 12,224,676 B2
(45) Date of Patent: Feb. 11, 2025

(54) FLYBACK CONVERTER PROVIDING ACCURATE SYNCHRONOUS RECTIFICATION AND METHOD OF CONTROLLING THE SAME

(71) Applicant: Ark Semiconductor Corp. Ltd., Shenzhen (CN)

(72) Inventors: Yi-Lun Shen, Taipei (TW); Yu-Yun Huang, Taipei (TW)

(73) Assignee: ARK MICROELECTRONIC CORP. LTD., Guangdong (CN)

( * ) Notice: Subject to any disclaimer, the term of this patent is extended or adjusted under 35 U.S.C. 154(b) by 289 days.

(21) Appl. No.: 18/089,598

(22) Filed: Dec. 28, 2022

(65) Prior Publication Data

US 2023/0216421 A1 Jul. 6, 2023

(30) Foreign Application Priority Data

Dec. 30, 2021 (CN) .......................... 202111659041.8

(51) Int. Cl.
*H02M 3/335* (2006.01)
*H02M 1/00* (2006.01)

(52) U.S. Cl.
CPC ..... *H02M 3/33592* (2013.01); *H02M 1/0009* (2021.05); *H02M 3/33515* (2013.01)

(58) Field of Classification Search
CPC ....................... H02M 3/33592; H02M 3/33515
See application file for complete search history.

(56) References Cited

U.S. PATENT DOCUMENTS

| 6,069,803 A | 5/2000 | Cross |
| 10,756,640 B1 * | 8/2020 | Radic ................. H02M 3/335 |
| 2004/0219399 A1 | 11/2004 | Zhu |
| 2009/0109715 A1 * | 4/2009 | Yang ............... H02M 3/33592 363/89 |
| 2014/0376272 A1 * | 12/2014 | Miao ............... H02M 3/33592 363/21.02 |

(Continued)

FOREIGN PATENT DOCUMENTS

| CN | 212875655 U | * | 4/2021 | |
| CN | 113726132 A | * | 11/2021 | ............. H02M 1/08 |

(Continued)

*Primary Examiner* — Sisay G Tiku
(74) *Attorney, Agent, or Firm* — Winston Hsu

(57) ABSTRACT

A synchronized rectification control method for use in a flyback converter is provided. The flyback converter includes a transformer including a secondary winding, a synchronous rectifier switch and a synchronous rectifier controller. The synchronous rectifier switch is coupled to the secondary winding and the synchronous rectifier controller, and is used to output a voltage difference signal and receive a control voltage. The method includes the synchronous rectifier controller detecting a rapid falling edge of the voltage difference signal to generate a rapid falling edge signal, generating an envelope signal according to the voltage difference signal, generating a time length control signal according to the voltage difference signal and the envelope signal, generating a blanking time signal according to the voltage difference signal and the time length control signal, and performing a logic operation on the blanking time signal and the rapid falling edge signal to generate the control voltage.

16 Claims, 9 Drawing Sheets

(56) References Cited

U.S. PATENT DOCUMENTS

| | | | |
|---|---|---|---|
| 2017/0187295 A1* | 6/2017 | Chen | H02M 3/33523 |
| 2020/0169180 A1 | 5/2020 | Jitaru | |
| 2021/0257920 A1* | 8/2021 | Cheng | H02M 3/33523 |
| 2023/0045561 A1* | 2/2023 | Yeh | H02M 3/33523 |
| 2023/0344359 A1* | 10/2023 | Yeh | H02M 1/0009 |

FOREIGN PATENT DOCUMENTS

| | | | |
|---|---|---|---|
| CN | 116667640 A * | 8/2023 | |
| TW | 201334377 A1 | 8/2013 | |
| TW | 202019070 A | 5/2020 | |

* cited by examiner

FLYBACK CONVERTER PROVIDING ACCURATE SYNCHRONOUS RECTIFICATION AND METHOD OF CONTROLLING THE SAME

BACKGROUND OF THE INVENTION

1. Field of the Invention

The present invention relates to power supplies, and in particular, to an active clamp flyback converter providing accurate synchronous rectification and a method of controlling the same.

2. Description of the Prior Art

A flyback converter offers the advantages of high conversion efficiency and low loss. The conventional flyback converter realizes regulation of the output voltage or the output current by controlling the main switch on the primary side of the transformer. Using a rectifier switch to replace the diode on the secondary side of the flyback converter to perform synchronous rectification is a common practice in the related art, and can greatly reduce the rectification loss, thereby improving the conversion efficiency of the power supply.

For the conventional method of controlling the rectifier switch, after the main switch is turned off by the control signal, the drain voltage of the main switch rises to release the energy stored in the transformer to the secondary side, lowering a voltage difference signal across the drain and the source of the rectifier switch. A controller can detect the decrease of the voltage across the rectifier switch to turn off the rectifier switch. However, when the flyback converter operates in the discontinuous conduction mode, the voltage across the rectifier switch resonates after the energy in the transformer is released to the secondary side, and the controller might falsely detect a falling edge of a resonant wave in the voltage across the rectifier switch and falsely turn on the rectifier switch.

As disclosed in Taiwan patent application no. 110124942 and China patent application no. 202110688325.3: (1) when the voltage across the rectifier switch has a higher rising gradient at the instant of turning on the main switch, trigger a short blanking time; (2) when the rising edge of a resonant wave in the voltage across the rectifier switch has a lower rising gradient as both the main switch and the rectifier switch are turned off, trigger a long blanking time. Accordingly, the falling edges of the voltage across the rectifier switch in the resonance period can be masked by applying different lengths of the blanking times according to the rising gradients, thereby preventing the rectifier switch from being falsely turned on. The conventional method of controlling the rectifier switch can accurately handle most conditions. However, when the rising edge of the resonant wave and the turning-on time of the main switch are close, an accurate detection of the rising gradient becomes difficult.

SUMMARY OF THE INVENTION

According to an embodiment of the invention, a flyback converter includes a transformer, a main switch, a synchronous rectifier switch and a synchronous rectifier controller, the transformer including a primary winding and a secondary winding, the primary winding being coupled to the main switch, the synchronous rectifier switch including a first terminal coupled to the secondary winding and the synchronous rectifier controller, and a second terminal coupled to a power output port and the synchronous rectifier controller, and a control terminal coupled to the synchronous rectifier controller, the synchronous rectifier switch being used to receive a control voltage from the synchronous rectifier controller to vary an impedance between the first terminal and the second terminal of the synchronous rectifier switch, a voltage difference signal being generated according to a voltage difference between the first terminal and the second terminal of the synchronous rectifier switch, the synchronous rectifier controller including an edge detection circuit, a blanking time circuit and an output circuit. A method of controlling synchronous rectification for the flyback converter includes the edge detection circuit detecting a fast falling edge of the voltage difference signal to generate a fast falling edge signal. Further, the method includes the blanking time circuit detecting a peak according to the voltage difference signal to generate an envelope signal, the blanking time circuit generating a time length control signal according to the voltage difference signal and the envelope signal, and the blanking time circuit generating a blanking time signal according to the voltage difference signal and the time length control signal. Furthermore, the method includes the output circuit performing a logic operation according to the blanking time signal and the fast falling edge signal to generate an output signal, so as to generate the control voltage.

According to another embodiment of the invention, a flyback converter includes a transformer, a main switch, a synchronous rectifier switch and a synchronous rectifier controller. The transformer includes a primary winding comprising a first terminal used to receive an input signal, and a second terminal, and a secondary winding comprising a first terminal and a second terminal. The main switch is coupled to the second terminal of the primary winding. The synchronous rectifier switch includes a first terminal coupled to the second terminal of the secondary winding and the synchronous rectifier controller, a second terminal coupled to a power output port and the synchronous rectifier controller, and a control terminal coupled to the synchronous rectifier controller and used to receive a control voltage to generate an output voltage. The synchronous rectifier controller includes an edge detection circuit, a blanking time circuit and an output circuit. The edge detection circuit is coupled to the first terminal of the synchronous rectifier switch, and is used to detect a fast falling edge of a voltage difference signal representing a voltage difference between the first terminal and the second terminal of the synchronous rectifier switch to generate a fast falling edge signal. The blanking time circuit is coupled to the first terminal of the synchronous rectifier switch, and is used to detect a peak according to the voltage difference signal to generate an envelope signal, generate a time length control signal according to the voltage difference signal and the envelope signal, and generate a blanking time signal according to the voltage difference signal and the time length control signal, the time length control signal indicating that a difference between the envelope signal and the voltage difference signal exceeds a predetermined threshold. The output circuit is coupled to the edge detection circuit and the blanking time circuit, and is used to perform a logic operation according to the blanking time signal and the fast falling edge signal to generate an output signal, so as to generate the control voltage.

These and other objectives of the present invention will no doubt become obvious to those of ordinary skill in the art

DETAILED DESCRIPTION

Figure 1:
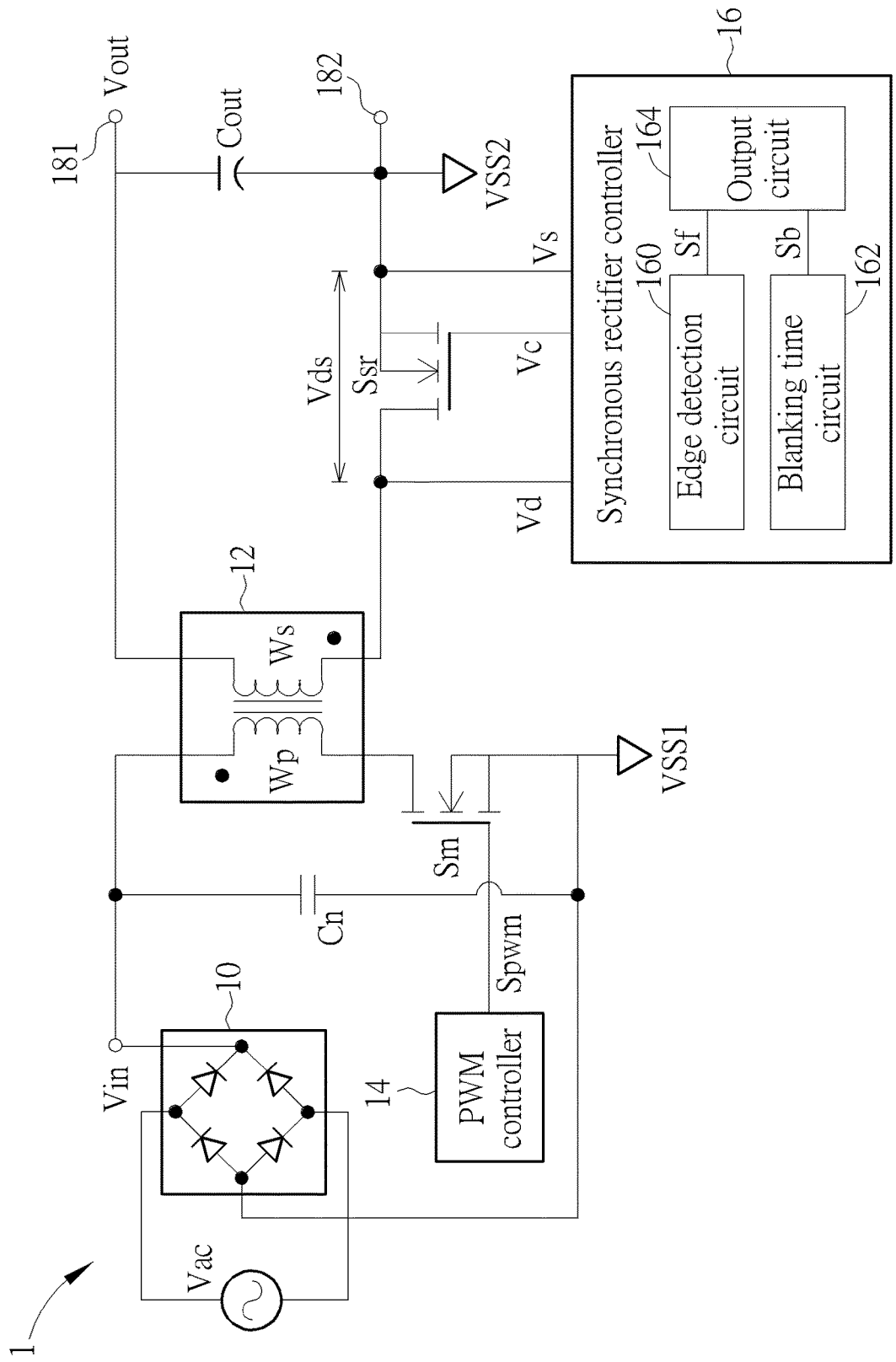
FIG. 1 is a circuit schematic of a flyback converter according to an embodiment of the invention.

FIG. 1 is a circuit schematic of a flyback converter 1 according to an embodiment of the invention. The flyback converter 1 may convert an alternating current (AC) voltage from a voltage source Vac into an input signal Vin, and generate an output signal Vout according to the input signal Vin. The input signal Vin and the output signal Vout may be DC voltages. The input signal Vin may be provided by a rectifier or other DC sources. The output signal Vout may be less than the input signal Vin.

The flyback converter 1 includes a rectifier 10, an input capacitor Cin, a transformer 12, a main switch Sm, a pulse width modulation (PWM) controller 14, a synchronous rectifier switch Ssr, a synchronous rectifier controller 16 and a capacitor Cout. The rectifier 10 is coupled to the voltage source Vac, the input capacitor Cin and the ground terminal VSS1. The input capacitor Cin is coupled between the rectifier 10 and the ground terminal VSS1. The rectifier 10 and the input capacitor Cin may convert the AC voltage into the DC input signal Vin. The transformer 12 includes a primary winding Wp and a secondary winding Ws. The primary winding Wp includes a first terminal configured to receive the input signal Vin, and a second terminal. The secondary winding Ws includes a first terminal and a second terminal. The main switch Sm includes a first terminal coupled to the second terminal of the primary winding Wp, a second terminal coupled to the ground terminal VSS1, and a control terminal coupled to the PWM controller 14. The synchronous rectifier switch Ssr includes a first terminal coupled to the second terminal of the secondary winding Ws and the synchronous rectifier controller 16, a second terminal coupled to the synchronous rectifier controller 16 and one of a high voltage terminal 181 or a ground terminal 182 of power output ports, and a control terminal coupled to the synchronous rectifier controller 16 and configured to receive a control voltage Vc to generate the output voltage Vout. The capacitor Cout includes a first terminal coupled to the high voltage terminal 181, and a second terminal coupled to the ground terminal 182. The ground terminal 182 may be coupled to a ground terminal VSS2. The ground terminal VSS1 and the ground terminal VSS2 may be separated from each other, and may respectively provide ground voltages. The main switch Sm and the synchronous rectifier switch Ssr may be realized by N-type metal-oxide-semiconductor field-effect transistors (MOSFET).

The PWM controller 14 may provide a PWM signal Spwm to the main switch Sm to selectively turn on or turn off the main switch Sm, so as to store and transfer energy. The synchronous rectifier controller 16 may provide the control voltage Vc to the synchronous rectifier switch Ssr to selectively turn on or turn off the synchronous rectifier switch Ssr, charging or discharging the capacitor Cout to generate the output signal Vout. The control voltage Vc may be generated according to a voltage difference signal Vds, the voltage difference signal Vds representing a voltage difference between the two terminals of the synchronous rectifier switch Ssr. For example, the synchronous rectifier controller 16 may detect the gradient and an envelope of the voltage difference signal Vds to turn on the synchronous rectifier switch Ssr when the transformer 12 releases energy to the secondary side, and to turn off the synchronous rectifier switch Ssr when the voltage difference signal Vds rises above a threshold upon the release of the energy. The primary winding Wp and the secondary winding Ws of the transformer 12 may have opposite polarities. The turns ratio of the primary winding Wp and the secondary winding Ws may be P:1, P being a positive number. In some embodiments, P may be greater than 1, and the transformer 12 may be a step-down transformer. The level of the output signal Vout may be related to the level of the input signal Vin, the duty cycle of the pulse width modulation signal Spwm, and the turns ratio.

The operation period of the flyback converter 1 may include a charge period, a discharge period and a resonant period. During the charge period, the PWM controller 14 may turn on the main switch Sm, the primary winding Wp may store energy, and the synchronous rectifier controller 16 may turn off the synchronous rectifier switch Ssr. During the discharge period, the PWM controller 14 may turn off the main switch Sm, the energy may be transferred to the secondary winding Ws, and the synchronous rectifier controller 16 may turn on the synchronous rectifier switch Ssr. When the flyback converter 1 operates in a discontinuous-conduction mode (DCM), during the resonant period, the PWM controller 14 may turn off the main switch Sm, and the synchronous rectifier controller 16 may turn off the synchronous rectifier switch Ssr.

The synchronous rectifier controller 16 may obtain the drain voltage Vd from the first terminal of the synchronous rectifier switch Ssr, and obtain the source voltage Vs from the second terminal of the synchronous rectifier switch Ssr, so as to generate the voltage difference signal Vds across the first terminal and the second terminal of the synchronous rectifier switch Ssr. The synchronous rectifier controller 16 may detect the gradient and the envelope of the voltage difference signal Vds to turn on the synchronous rectifier switch Ssr at the correct time.

The synchronous rectifier controller 16 may include an edge detection circuit 160, a blanking time circuit 162 and an output circuit 164. The edge detection circuit 160 and the blanking time circuit 162 may be coupled to the output circuit 164. The edge detection circuit 160 may detect the fast falling edge of the voltage difference signal Vds to generate a fast falling edge signal Sf. During the discharge period of the flyback converter 1, once the main switch Sm is turned off, the voltage difference signal Vds will drop rapidly. During the resonant period, resonance will occur in the voltage difference signal Vds and the magnitude of the resonance may be reduced gradually. The edge detection circuit 160 may detect the gradient of the voltage difference signal Vds to identify the fast falling edge of the voltage difference signal Vds and the falling edge of the resonance. Upon detecting the gradient of the falling edge of the voltage difference signal Vds exceeding a threshold level, the edge detection circuit 160 may generate a pulse in the fast falling edge signal Sf.

The blanking time circuit 162 may set a blanking time of the synchronous rectifier switch Ssr to prevent the synchronous rectifier controller 16 from turning on the synchronous rectifier switch Ssr at an incorrect time. During a blanking time, even if the fast falling edge signal Sf occurs, the synchronous rectifier switch Ssr will not be turned on. During the resonant period of the flyback converter 1, the blanking time circuit 162 may set a longer blanking time Tb1 to mask the resonant wave for a longer period of time and prevent turning on the synchronous rectifier switch Ssr. During the charge period, since an ON time of the main switch Sm must be longer than the blanking time, and a fast falling edge of the voltage difference signal Vds is about to occur to turn on the synchronous rectifier switch Ssr correctly, the blanking time circuit 162 may set a shorter blanking time Tb1 to reduce the lower limit of the ON time, thereby providing a higher frequency of switching the main switch Sm. The blanking time circuit 162 may detect the peak according to the voltage difference signal Vds to generate the envelope signal, generate the time length control signal according to the voltage difference signal Vds and the envelope signal, and generate the blanking time signal Sb according to the voltage difference signal Vds and the time length control signal. The blanking time signal Sb may be an active low signal, having the low logic level when the blanking time signal Sb is enabled and the high logic level when the blanking time signal Sb is disabled. The time length control signals may be generated according to a difference between the envelope signal and the voltage difference signal Vds. For example, when the difference between the envelope signal and the voltage difference signal Vds is less than a predetermined threshold, the flyback converter 1 is in the charge period, and a time length control signal corresponding to a shorter blanking time may be generated. When the difference between the envelope signal and the voltage difference signal Vds exceeds the predetermined threshold, the flyback converter 1 is in the resonant period, and a time length control signal corresponding to a longer blanking time may be generated.

The output circuit 164 may generate a control voltage Vc after performing an logic operation according to the blanking time signal Sb and the fast falling edge signal Sf and performing a voltage regulation control, thereby controls the synchronous rectifier switch Ssr via a driver circuit. The logic operation may include, but is not limited to, an AND operation. In some embodiments, when the blanking time signal Sb is set to the low logic level, an AND operation of the blanking time signal Sb and the fast falling edge signal Sf will keep an output signal Sgt of the AND operation at the low logic level. When the blanking time signal Sb is disabled, the output circuit 164 may generate an output signal according to the fast falling edge signal Sf, for example, when (1) the blanking time signal Sb is at a high logic level, and (2) the output circuit 164 receives a pulse in the fast falling edge signal Sf, the output signal Sgt is set to the high logic level, setting the control voltage Vc to an enabled state.

While FIG. 1 shows that the synchronous rectifier switch Ssr is placed on the low side of the secondary winding WS, the synchronous rectifier switch Ssr may also be placed on the high side of the secondary winding WS, it would be apparent to those skilled in the art to adjust the turn-on condition of the synchronous rectifier switch Ssr according to the principle of the invention.

Figure 2:
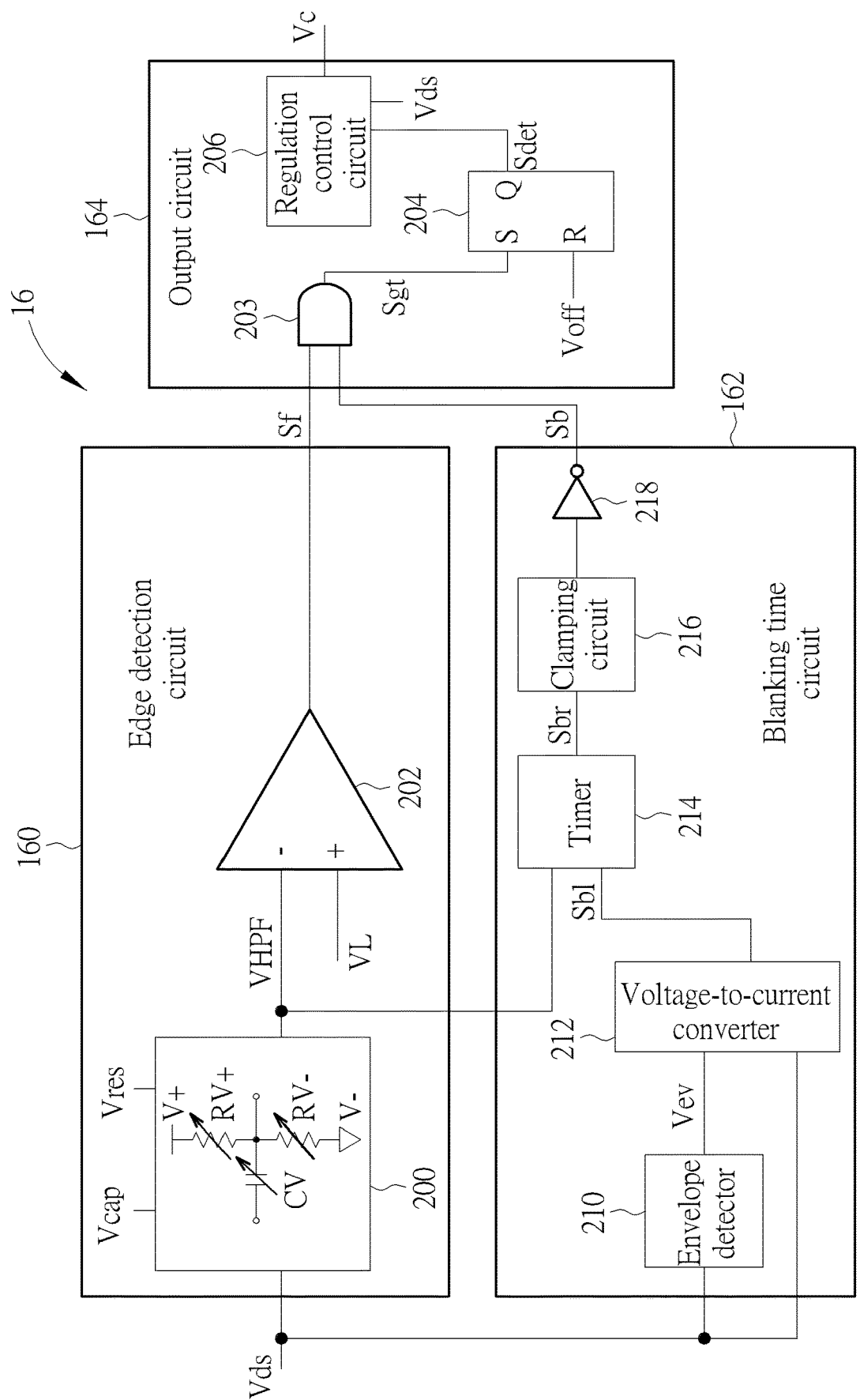
FIG. 2 is a circuit schematic of the synchronous rectifier controller in FIG. 1.

FIG. 2 is a schematic diagram of the synchronous rectifier controller 16 of the flyback converter 1. The edge detection circuit 160 of the synchronous rectifier controller 16 includes a filter 200 and a comparator 202 coupled thereto. The filter 200 is further coupled to the first terminal of the synchronous rectifier switch Ssr to receive the voltage difference signal Vds.

The filter 200 may be a high-pass filter for filtering the voltage difference signal Vds to generate the filtered voltage difference signal VHPF. The filter 200 may include a variable capacitor CV and variable resistors RV+, RV−. The variable capacitor CV includes a first terminal configured to receive the voltage difference signal Vds; and a second terminal. The resistor Rd2 includes a first terminal coupled to the second terminal of the resistor Rd1 and configured to provide the divided voltage Vd, and a second terminal coupled to the ground terminal. The variable resistor RV− includes a first terminal coupled to the second terminal of the variable capacitor CV; and a second terminal coupled to a supply terminal V+. The voltage of the supply terminal V+ may exceed the voltage of the supply terminal V−, for example, the voltage of the supply terminal V+ may be 3.3V, and the voltage of the supply terminal V− may be 0V. The edge detection circuit 160 may adjust a capacitance adjustment signal to control the capacitance of the variable capacitor CV, adjust a first resistance adjustment signal to control the resistance of the variable resistor RV+, and adjust a second resistance adjustment signal to control the resistance of the variable resistor RV−. The cutoff frequency f of the filter 200 may be equal to an inverse of a product of a constant $2\pi$, the resistance R1 of the variable resistor RV+, and the capacitance C of the variable capacitor CV ($f=1/(2\pi R1C)$). Upon power-up of the flyback converter 1, the edge detection circuit 160 may adjust the resistances of the variable resistors RV+, RV− and the capacitance of the variable capacitor CV for the cutoff frequency f to exceed the resonant frequency of the voltage difference signal Vds, and to be less than the frequency of the fast falling edge in the voltage difference signal Vds. Therefore, the filter 200 may fully remove or significantly attenuate the resonance, and fully pass or slightly attenuate the fast falling edge to generate a filtered voltage difference signal VHPF. In some embodiments, the synchronous rectifier controller 16 may be coupled to an off-chip adjustable resistor or an off-chip adjustable capacitor via connecting pins. In a factory test of the flyback converter 1, the resistance of the off-chip resistor or the capacitance of the off-chip capacitor may be changed to adjust the cutoff frequency f of the filter 200, for the high-pass filter 200 to: (1) enabling a fast falling edge of the voltage difference signal Vds to effectively passes through the filter 200 to generate the output of a subsequent logic circuit; and (2) filtering out a slow resonant wave in the voltage difference signal Vds to prevent the resonant wave from affecting the output of the subsequent logic circuit.

The comparator 202 may compare the filtered voltage difference signal VHPF and the threshold level VL to generate the fast falling edge signal Sf. The comparator 202 includes an inverting input terminal configured to receive the filtered voltage difference signal VHPF; a non-inverting input terminal configured to receive a threshold level VL; and an output terminal configured to output the fast falling edge signal Sf. When the filtered voltage difference signal VHPF is less than the threshold level VL, the comparator 202 may set the fast falling edge signal Sf to the high logic level to indicate that a fast falling edge is detected. When the filtered voltage difference signal VHPF is not less than the threshold level VL, the comparator 202 may set the fast falling edge signal Sf to a low logic level to indicate that no fast falling edge is detected.

Figure 3:
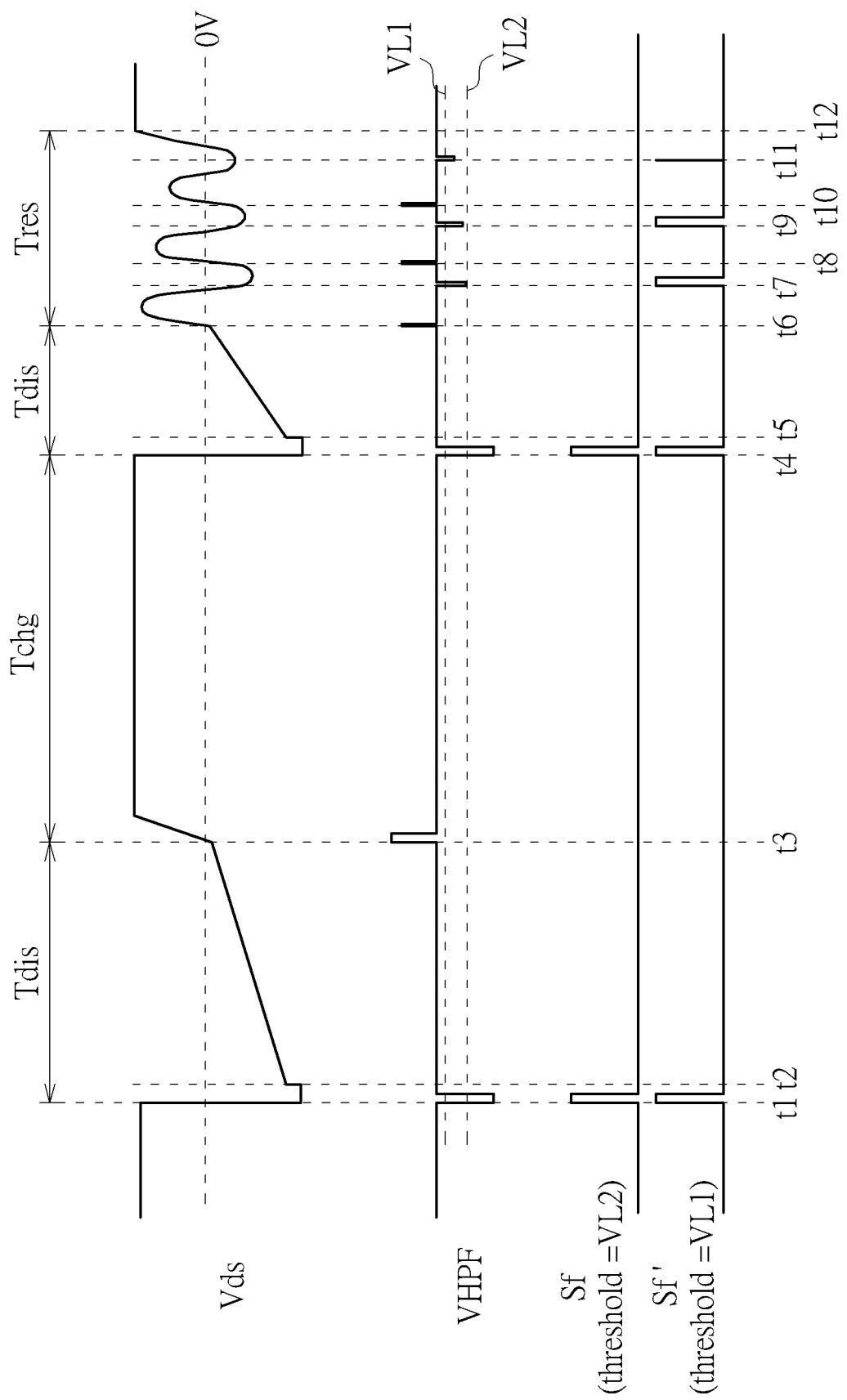
FIG. 3 shows waveforms of the edge detection circuit in FIG. 2.

FIG. 3 shows the waveforms of the edge detection circuit 160 in FIG. 2, including the voltage difference signal Vds, the filtered voltage difference signal VHPF, the fast falling edge signal Sf, and the threshold levels VL1 and VL2. The threshold level VL1 is higher than the threshold level VL2. FIG. 3 shows Time t1 to Time t12, in which a discharge period Tdis is present between Time t1 and Time t3, a charge period Tchg is present between Time t3 and Time t4, another discharge period Tdis is present between Time t4 and Time t6, and a resonant period Tres is present between Time t6 and Time t12.

The edge detection circuit 160 may set the threshold level VL1 or VL2 to be the threshold level LV of the comparator 202, so as to detect the fast falling edge. An example of using the threshold level VL2 to detect the fast falling edge is provided in the subsequent paragraphs. At Time t1, a fast falling edge in the voltage difference signal Vds occurs, and consequently, a slightly attenuated fast falling edge occurs in the filtered voltage difference signal VHPF. Between Time t1 and Time t2, since the filtered voltage difference signal VHPF is less than the threshold level VL2, a high pulse will be generated in the fast falling edge signal Sf. Between Time t2 and Time t4, since the filtered voltage difference signal VHPF is higher than the threshold level VL2, the fast falling edge signal Sf will be set to the low logic level. At Time t4, the fast falling edge of the voltage difference signal Vds occurs again, resulting in a slightly attenuated fast falling edge in the filtered voltage difference signal VHPF accordingly. Between Time t4 and Time t5, since the filtered voltage difference signal VHPF is less than the threshold level VL2, a high pulse will be generated in the fast falling edge signal Sf. After Time t5, since the filtered voltage difference signal VHPF is higher than the threshold level VL2, the fast falling edge signal Sf is set to the low logic level. At Time t6, the resonant period Tres starts, and the voltage difference signal Vds starts to resonate. Although negative pulses occur in the filtered voltage difference signal VHPF between Time t7 and Time t8, Time t9 and Time t10, and at Time t11, the filtered voltage difference signal VHPF is higher than the threshold level VL2, and therefore, the fast falling edge signal Sf remains at the low logic level during the three negative pulses in the filtered voltage difference signal VHPF. Therefore, the comparator 202 can accurately detect the fast falling edge and ignore the falling edge of resonant waves using the threshold level VL2.

If the threshold level VL1 is used to detect the fast falling edge, the fast falling edge signal Sf between Time t1 and Time t7 will be similar to the fast falling edge signal Sf between Time t1 and Time t7. However, since the filtered voltage difference signal VHPF is less than the threshold level VL1 between Time t7 and Time t8, between Time t9 and Time t10, and at Time t11, high pulses are generated in the fast falling edge signal Sf' during the three negative pulses in the filtered voltage difference signal VHPF. Since the filtered voltage difference signal VHPF is higher than the threshold level VL1 between Time t8 and Time t9, between Time t10 and Time t11, and after Time t11, the fast falling edge signal Sf is set to the low logic level. If the threshold level VL1 is used in the comparator 202, the falling edge of the resonance may be falsely detected, and the synchronous rectifier switch may be falsely turned on. Therefore, during the factory test of the flyback converter 1, it is preferable to set the threshold level VL of the comparator 202 of the edge detection circuit 160 to the threshold level VL2, or set the resistance R and the capacitance C of the filter 200 until the amplitudes of all the troughs of the resonant waves of the filtered voltage difference signals VHPF are higher than the threshold level VL1.

Referring to FIG. 2, the blanking time circuit 162 includes an envelope detector 210, a voltage-to-current converter 212, a timer 214, a clamping circuit 216 and an inverter 218 coupled in sequence. The envelope detector 210 and the voltage-to-current converter 212 are further coupled to the first terminal of the synchronous rectifier switch Ssr to receive the voltage difference signal Vds. The timer 214 is further coupled to the output terminal of the filter 200 to receive the filtered voltage difference signal VHPF.

The envelope detector 210 may be a voltage envelope detector, and may detect the peak of the voltage difference signal Vds to generate an envelope signal Vev of the voltage difference signal Vds. The voltage-to-current converter 212 may be an operational transconductance amplifier, and generates a differential current (gm*(Vev−Vds)) according to a difference between the envelope signal Vev and the voltage difference signal Vds (Vev−Vds)) to serve as the time length control signal Sbl, gm being a transconductance. Since the difference (Vev−Vds) between the envelope signal Vev and the voltage difference signal Vds during the resonant periods (FIG. 4, periods P11, P12, P13, P21, P22, P23) will be greater than the difference (Vev−Vds) during the charge period (FIG. 4, periods F1, F2, F3), the time length control signal Sbl during the resonant period will be set greater than the time length control signal Sbl during the charge period according to the difference (Vev−Vds).

When the filtered voltage difference signal VHPF rises and exceeds a positive threshold voltage, it may be considered that a rising edge of the voltage difference signal Vds has been detected and the timer 214 is triggered to time the time. The timer 214 may generate an inverted blanking time signal Sbr according to the time length control signal Sbl. When the time length control signal Sbl is small, the timer 214 may generate pulses with a shorter period in the inverted blanking time signal Sbr. When the time length control signal Sbl is large, the timer 214 may generate a pulse with a longer period in the inverted blanking time signal Sbr. When the filtered voltage difference signal VHPF is less than the positive threshold voltage, it may be considered that the rising edge of the voltage difference signal Vds has not been detected, and the timer 214 may be reset without generating a pulse. Since the resonant waves are symmetrical in shape, the positive threshold voltage may be selected to have an absolute value same as the negative threshold level VL, but is positive in polarity.

The clamping circuit 216 may limit the inverted blanking time signal Sbr within a predetermined range, and the inverter 218 may invert the inverted blanking time signal Sbr to generate the blanking time signal Sb. The predetermined range may be between an upper pulse length and a lower pulse length, e.g., 30% to 90% of the expected resonant period.

The output circuit 164 includes an AND gate 203, a flip-flop 204 and a regulation control circuit 206. The AND gate 203 includes a first terminal coupled to the output terminal of the edge detection circuit 160 to receive the fast falling edge signal Sf; a second terminal coupled to the output terminal of the inverter 218 to receive the blanking time signal Sb; and an output terminal configured to output the output signal Sgt. The regulation control circuit 206 includes a first terminal coupled to an output terminal Q of the flip-flop 204, and a second terminal coupled to the first terminal of the synchronous rectifier switch Ssr to receive the voltage difference signal Vds.

When the blanking time signal Sb is enabled, the AND gate 203 may output the low logic level in the output signal Sgt. When the blanking time signal Sb is disabled, the AND gate 203 may generate the output signal Sgt according to the fast falling edge signal Sf. Specifically, when the blanking time signal Sb is disabled, the output signal Sgt may be equal to the fast falling edge signal Sf. As disclosed in Taiwan patent application no. 110131031 and China patent application no. 202110825305.6, the regulation control circuit 206 may adjust the control voltage Vc and output the control voltage Vc to the gate of the synchronous rectifier switch Ssr to change the impedance between the first terminal and the second terminal of the synchronous rectifier switch Ssr.

The flip-flop 204 may receive the fast falling edge signal Sf to generate a turn-on signal Sdet. The flip-flop 204 may be an SR flip-flop, and may include an input terminal S configured to receive the fast falling edge signal Sf; an input terminal R configured to receive a reset voltage Voff; and an output terminal Q configured to output the turn-on signal Sdet. Before the fast falling edge signal Sf of the voltage difference signal Vds occurs, the reset voltage Voff is at the low logic level. If the fast falling edge signal Sf is at the high logic state, the turn-on signal Sdet at the output terminal Q of the flip-flop 204 will be set to the high logic level. If the fast falling edge signal Sf is at the low logic level, the turn-on signal Sdet may be maintained at the previous logic level. The reset voltage Voff corresponds to any possible condition of turning off the synchronous rectifier switch Ssr. For example, the voltage difference signal Vds gradually increases from a lower negative voltage to above a predetermined voltage, e.g, from −80 mV to above −5 mV. At the time, the main switch Sm indicates that the primary side of the flyback converter 1 is turned on, and the reset voltage Voff may be set to the high logic level to reset the flip-flop 204, setting that the turn-on signal Sdet to the low logic level, so as to quickly turn off the synchronous rectifier switch Ssr.

Figure 4:
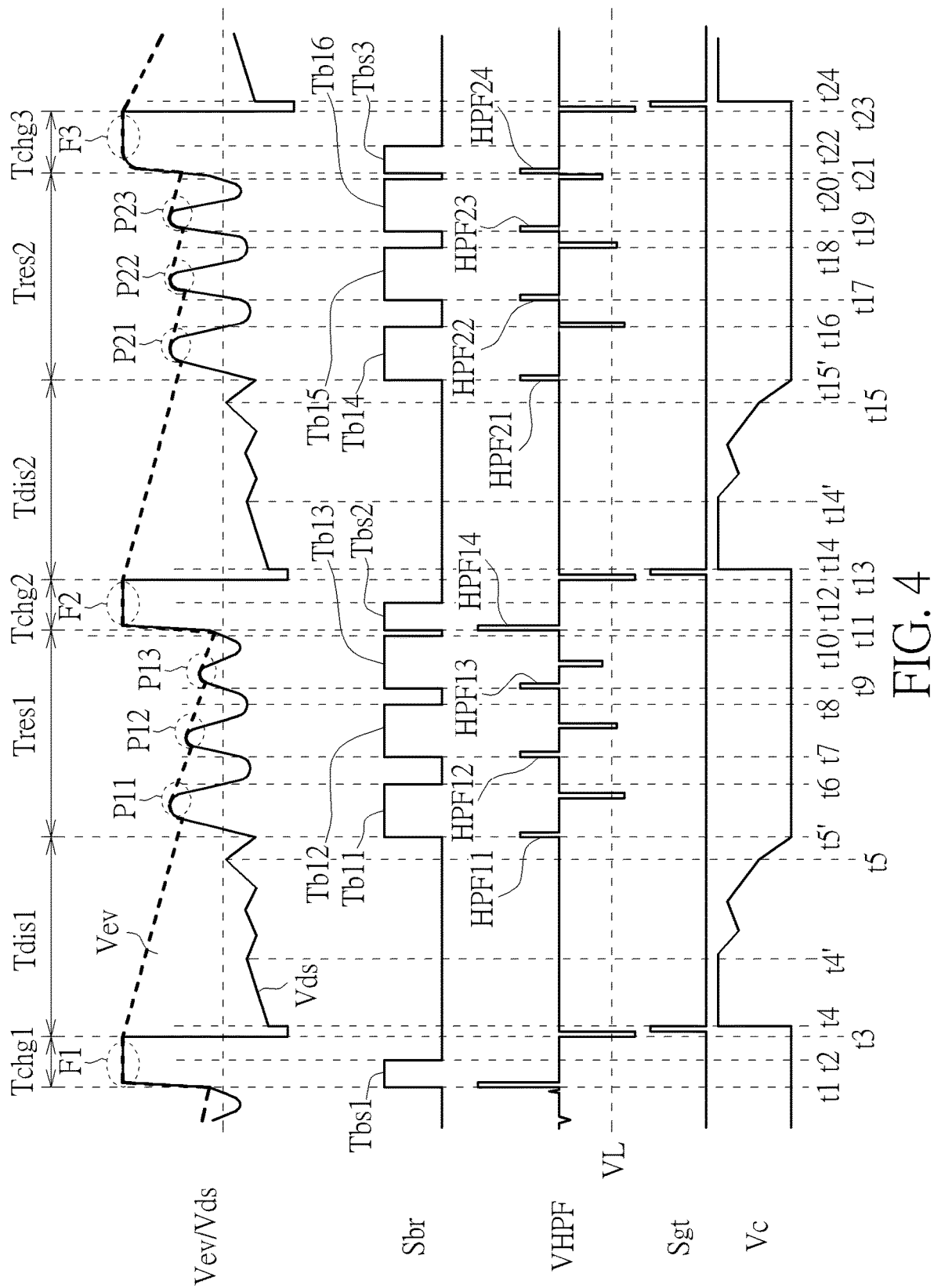
FIG. 4 shows waveforms of the synchronous rectifier controller in FIG. 2.

FIG. 4 shows waveforms of the synchronous rectifier controller 16 in FIG. 2, including the voltage difference signal Vds, the envelope signal Vev, the inverted blanking time signal Sbr, the filtered voltage difference signal VHPF, and the output signal Sgt and the control voltage Vc. FIG. 4 shows Time t1 to t24, in which a charge period Tchg1 is between Time t1 and Time t3, a discharge period Tdis1 is between Time t3 and Time t5, a resonant period Tres1 is between Time t5 and Time t11, a charge period Tchg2 is between Time t11 and Time t13, a discharge period Tdis2t is between Time t13 and Time t15, a resonant period Tres2 is between Time t15 and Time t21, and a charge period Tchg3 is between Time t21 and Time t23. FIG. 4 is explained with reference to the synchronous rectifier controller 16 in FIG. 2.

At Time t1, the charge period Tchg1 starts, the filtered voltage difference signal VHPF rapidly rises above the threshold voltage, triggering the timer 214 to start timing, and setting the inverted blanking time signal Sbr to the high logic level. Between Time t1 and Time t2, the envelope signal Vev rises with the voltage difference signal Vds. Since the difference between the voltage difference signal Vds and the envelope signal Vev is small, a short pulse Tbs1 is generated in the inverted blanking time signal Sbr.

At Time t3, the main switch Sm is turned off, and the discharge period Tdis1 starts, the voltage difference signal Vds drops rapidly, resulting in a negative pulse lower than the threshold voltage VL in the filtered voltage difference signal VHPF to set the fast falling edge signal Sf to the high logic level. The inverted blanking time signal Sbr has dropped to the low logic level for the AND gate 203 to enable the fast falling edge signal Sf at the high logic level to be passed to the inverter 204 to output the turn-on signal Sdet, and the turn-on signal Sdet is then transmitted to the regulation control circuit 206. At Time t4, the turn-on signal Sdet at the high logic level raises the control voltage Vc to fully turn on the synchronous rectifier switch Ssr and set the same to a lower impedance. Between Time t4 and Time t4', the current Id flowing through the synchronous rectifier switch Ssr gradually drops as the discharge time increases, pulling up the voltage difference signal Vds from a negative value towards 0V. At Time t4', when the voltage difference signal Vds gradually rises to −30 mV, the regulation control circuit (not shown, an example of the regulation control circuit can be found in Taiwan patent application No. 110131031 and China patent application No. 202110825305.6) is triggered to reduce the control voltage Vc, so that the synchronous rectifier switch Ssr is no longer in a fully turn-on state having the lower impedance. Between Time t4' and Time t5, the voltage difference signal Vds may be regulated slightly up and down around −30m V by increasing the impedance of the synchronous rectifier switch Ssr.

At Time t5, when the current Id continues to decrease, the voltage difference signal Vds gradually rises to exceed −5m V despite the increase in the impedance of the synchronous rectifier switch Ssr, triggering the reset voltage Voff to reset the turn-on signal Sdet to the low logic level.

At Time t5', the turn-on signal Sdet at the low logic level reduces the control voltage Vc to 0V, thereby turning off the synchronous rectifier switch Ssr. When the flyback converter 1 operates in the discontinuous conduction mode (DCM), both the main switch Sm and the synchronous rectifier switch Ssr are turned off, and the resonant period Tres1 starts at Time t5'. The voltage difference signal Vds resonates and starts to rise, generating a positive pulse HPF11 in the filtered voltage difference signal VHPF. Since the voltage difference signal Vds is not yet equal to the envelope signal Vev, the envelope signal Vev continues to drop.

(1) After Time t5', when the filtered voltage difference signal VHPF exceeds the positive threshold voltage, the timer 214 is triggered to switch the inverted blanking time signal Sbr to the high logic level. (2) Between Time t5' and Time t6, a peak P11 occurs in the voltage difference signal Vds, and the envelope signal Vev is pulled up to the peak P11 and then gradually decreases according to a preset droop rate, the voltage difference signal Vds decreases rapidly according to the gradient of the resonant wave. Therefore, at a time after the peak P11, a large difference between the voltage difference signal Vds and the envelope signal Vev triggers the voltage-to-current converter 212 to output a longer time length control signal Sbl, generating a long pulse Tb11 in the inverted blanking time signal Sbr. In this manner, despite that the filtered voltage difference signal HPFF generated by the falling edge of the resonant wave of the voltage difference signal Vds might drop below the threshold voltage VL to trigger a high logic level in the fast falling edge signal Sf, the AND gate 203 will prevent the output signal Sgt from being pulled up to pull up the control voltage Vc during the long pulse Tb11. If the length of the long pulse Tb11 is less than an upper pulse length, the length of the long pulse Tb11 may be positively correlated with the difference between the voltage difference signal Vds and the envelope signal Vev. Between Time t6 and Time t7, despite that the difference between the voltage difference signal Vds and the envelope signal Vev is still large, the clamping circuit 216 will set the inverted blanking time signal Sbr to the low logic level when the length of the long pulse Tb11 reaches the upper pulse length.

After Time t7, when the filtered voltage difference signal VHPF exceeds the positive threshold voltage, the timer 214 is triggered to switch the inverted blanking time signal Sbr to the high logic level. Between Time t7 and Time t8, a peak P12 occurs in the voltage difference signal Vds, the envelope signal Vev is pulled up to the peak P12 and then starts to gradually decrease according to its preset droop rate, the voltage difference signal Vds decreases rapidly according to the gradient of the resonant wave. Therefore, after the peak P12, a large difference between the voltage difference signal Vds and the envelope signal Vev triggers the voltage-to-current converter 212 to output a longer time length control signal Sbl, generating a long pulse Tb12 in the inverted blanking time signal Sbr. In this manner, despite that the filtered voltage difference signal HPFF generated by the falling edge of the resonant wave of the voltage difference signal Vds might drop below the threshold voltage VL to trigger a high logic level in the fast falling edge signal Sf, the AND gate 203 will prevent the output signal Sgt from being pulled up to pull up the control voltage Vc during the long pulse Tb12. If the length of the long pulse Tb12 is less than the upper pulse length, the length of the long pulse Tb12 may be positively correlated with the difference between the voltage difference signal Vds and the envelope signal Vev. Between Time t8 and Time t9, despite that the difference between the voltage difference signal Vds and the envelope signal Vev is still large, the clamping circuit 216 will set the inverted blanking time signal Sbr to the low logic level upon the length of the long pulse Tb12 reaching the upper pulse length.

After Time t9, when the filtered voltage difference signal VHPF exceeds the positive threshold voltage, the timer 214 is triggered to switch the inverted blanking time signal Sbr to the high logic level. Between Time t9 and Time t10, a peak P13 occurs in the voltage difference signal Vds, the envelope signal Vev is pulled up to the peak P13 and then starts to gradually decrease according to its preset droop rate, the voltage difference signal Vds decreases rapidly according to the gradient of the resonant wave. Therefore, after the peak P13, a large difference between the voltage difference signal Vds and the envelope signal Vev triggers the voltage-to-current converter 212 to output a longer time length control signal Sbl, generating a long pulse Tb13 in the inverted blanking time signal Sbr. The filtered voltage difference signal HPFF generated by the falling edge of the resonant wave of the voltage difference signal Vds is higher than the threshold voltage VL, maintaining the fast falling edge signal Sf at the low logic level. Consequently, the AND gate 203 will not pull high the output signal Sgt, preventing the control voltage Vc from being pulled up.

The synchronous rectifier controller 16 may operate between Time t11 and Time t20 in the same manner as between the Time t1 and Time t10, and the explanation therefor will not be repeated here for brevity.

Between Time t20 and Time t21, the voltage difference signal Vds is pulled up again to form another peak, lifting up the envelope signal Vev. However, (1) the resonant decay is slow, and the voltage levels at the peaks P21-P23 are close to each other, (2) when the fourth resonant wave is about to reach the fourth peak, the charge period Tchg3 starts, and the voltage difference signal Vds is quickly pulled up from a voltage level close to a resonance peak to another peak of the voltage difference signal Vds during turning off the synchronous rectifier switch Ssr, and the envelope signal Vev is pulled up accordingly. As a result, a positive pulse occurs in the filtered voltage difference signal VHPF, and the difference between the voltage difference signal Vds and the envelope signal Vev switches the inverted blanking time signal Sbr to the high logic level.

As shown in FIG. 4, between Time t15 and Time t20, the rising edges of the first three peaks P21~P23 in the voltage difference signal Vds correspond to the pulses HPF21~23 in the filtered voltage difference signal HPFF, respectively, and the pulse HPF24 in the filtered voltage difference signal HPFF starts at Time t21 in the charge period Tchg3. Since the voltage difference signal Vds is quickly pulled up from the voltage level close to the resonance peak to the peak of the voltage difference signal Vds during turning off the synchronous rectifier switch Ssr, the voltage level of the positive pulse HPF24 is the same as those of the positive pulses HPF21-23. According to the embodiments disclosed in Taiwan patent application no. 110124942 and China patent application no. 202110688325.3, a long pulse Tb1 is falsely generated in the period of the inverted blanking time signal Sbr according to the voltage level of the positive pulse HPF24, and may block the fast falling edge signal Sf at Time t24, stopping the fast falling edge signal Sf from being propagated to the flip-flop 204.

In the embodiment, between Time t21 and Time t22, since the voltage difference signal Vds and the envelope signal Vev are almost overlapping, the difference between the voltage difference signal Vds and the envelope signal Vev is small, resulting in the blanking time circuit 162 generating a short pulse Tbs3 in the inverted blanking time signal Sbr. Between Time t22 and Time t24, the inverted blanking time signal Sbr is switched to the high logic level, so that the fast falling edge signal Sf may be passed to the inverter 204 at Time t24.

The synchronous rectification controller 16 operates between Time t23 and t24 in the same manner as between Time t3 and t4, and explanation therefor will be omitted for brevity.

In the embodiments in FIGS. 1 and 2, the flyback converter 1 automatically adjusts the turn-on condition of the synchronous rectifier switch Ssr by detecting the envelope of the voltage difference signal Vds without using an external pin, reducing the probability of falsely turning on the synchronous rectifier switch Ssr while increasing the operating efficiency of the flyback converter 1.

Figure 5:
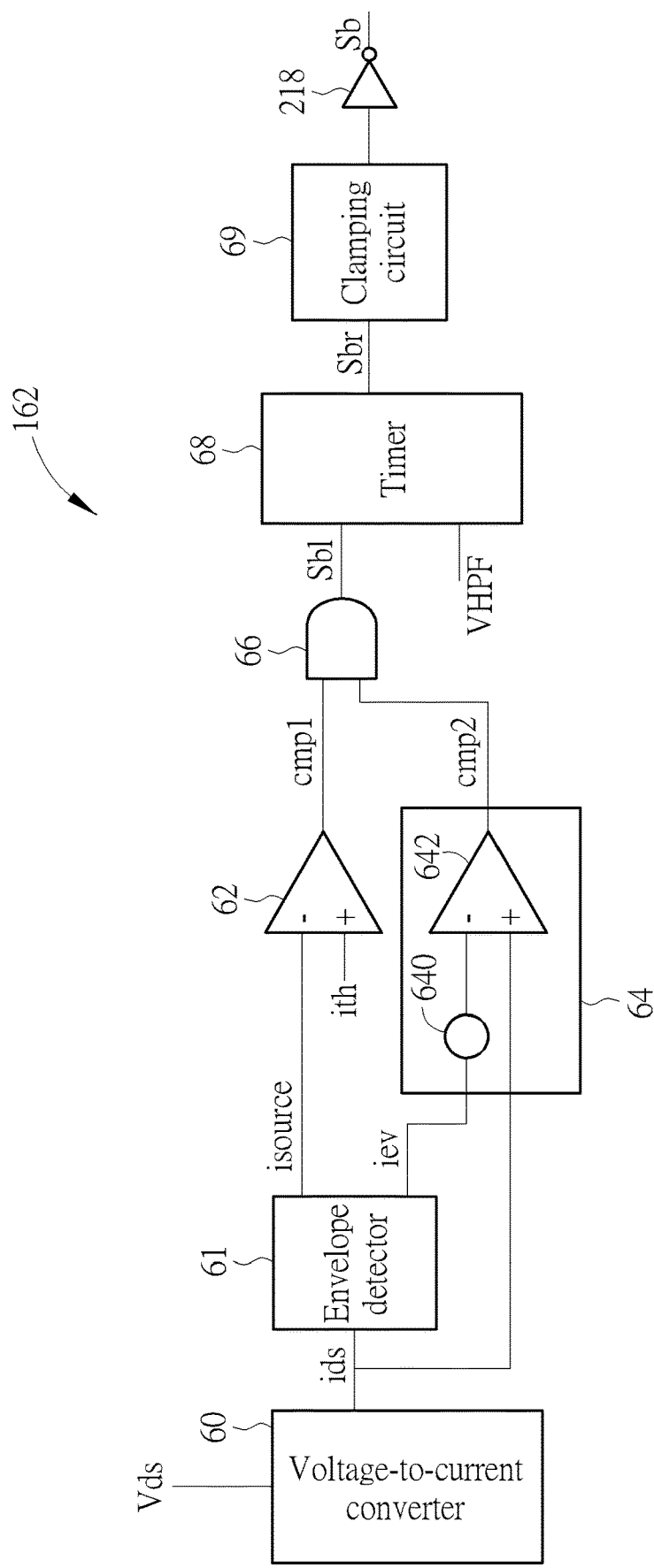
FIG. 5 is a circuit schematic of the blanking time circuit in FIG. 1.

FIG. 5 is a circuit schematic of another blanking time circuit 162 of the flyback converter 1. The blanking time circuit 162 in FIG. 5 may be used to replace the blanking time circuit 162 in FIG. 2 and may generate the blanking time signal Sb. The blanking time circuit 162 of FIG. 5 includes a voltage-to-current converter 60, an envelope detector 61, a comparator 62, a comparison circuit 64, an AND gate 66, a timer 68, a clamping circuit 69 and an inverter 218. The voltage-to-current converter 60 may be coupled to the first terminal of the synchronous rectifier switch Ssr, the envelope detector 61 may be coupled to the voltage-to-current converter 60, the comparator 62 may be coupled to the envelope detector 61, and the comparison circuit 64 may be coupled to the envelope detector 61 and the voltage-to-current converter 60, the gate 66 may be coupled to the comparators 62 and 64, the timer 68 may be coupled to the gate 66, the clamping circuit 69 may be coupled to the timer 68, and the inverter 218 may be coupled to the clamping circuit 69.

The voltage-to-current converter 60 may be a resistor, and may convert the voltage difference signal Vds into a flowing current ids. The envelope detector 61 may be a current envelope detector, detecting the peaks of the current ids to generate a pull-up signal isource and an envelope signal iev. The envelope signal iev represents the envelope of the current ids. The pull-up signal isource is a charging current configured to generate the envelope signal iev. When the envelope signal iev is less than the current ids, the pull-up signal isource will be set to the high logic level, and the internal power supply of the envelope detector 61 will be turned on to pull the envelope signal iev to the current ids, keeping the envelope signal iev greater than or equal to the current ids.

The comparator 62 includes an inverting input terminal coupled to the envelope detector 61 configured to receive the pull-up signal isource; a non-inverting input terminal configured to receive a threshold current ith; and an output terminal configured to output a digital signal cmp1. The comparator 62 may compare the pull-up signal isource and the threshold current ith to generate the digital signal cmp1. The digital signal cmp1 may be an active high signal. When the pull-up signal isource is less than the threshold current ith, the comparator 62 may enable the digital signal cmp1. When the pull-up signal isource exceeds the threshold current ith, the comparator 62 may disable the digital signal cmp1. The digital signal cmp1 may represent a drooping time of the pull-up signal isource. During a period when the envelope signal iev is greater than or equal to the current ids, the envelope detector 61 may cease to pull up the envelope signal iev, so as to gradually lower the envelope signal iev or keep the will envelope signal iev constant. The period may be referred to as a droop time.

The comparison circuit 64 may compare the envelope signal iev and the current ids to generate the digital signal cmp2. The digital signal cmp2 may be an active high signal. When the difference between the envelope signal iev and the current ids is less than a preset difference os, the comparison circuit 64 may enable the digital signal cmp2. When the difference between the envelope signal iev and the current ids exceeds the preset difference os, the comparison circuit 64 may disable the digital signal cmp2. The comparison circuit 64 includes a level shifter 640 and a comparator 642 coupled thereto. The level shifter 640 includes a first terminal coupled to the envelope detector 61 configured to receive the envelope signal iev; and a second terminal. The level shifter 640 may shift the envelope signal iev down by the preset difference os to generate a shifted signal (iev-os). The comparator 642 includes an inverting input terminal coupled to the second terminal of the level shifter 640 and configured to receive the shift signal (iev-os); a non-inverting input terminal coupled to the voltage-to-current converter 60 and configured to receive flowing current ids; and an output terminal configured to output a digital signal cmp2. The digital signal cmp2 may represent a peak duration covering a peak in the adjacent envelope signal iev. The resonance peak of the current ids (FIG. 6, P1 to P3) and the top platform in the charge period (FIG. 5, F1) set the digital signal cmp2 to the high logic level.

The digital signal cmp1 and the digital signal cmp2 may be applied to the AND gate 66 to generate the time length control signal Sbl. When the digital signal cmp1 and the digital signal cmp2 are both at the high logic level, the AND gate 66 may set the time length control signal Sbl to the high logic level to indicate the detection of the top platform in the charge period.

When the filtered voltage difference signal VHPF exceeds the threshold voltage, it may be considered that a rising edge of the voltage difference signal Vds has been detected and the timer 68 is triggered to time the time. The timer 68 may generate an inverted blanking time signal Sbr according to the time length control signal Sbl. When the time length control signal Sbl is at the low logic level, the timer 68 may generate longer pulses in the inverted blanking time signal Sbr. When the time length control signal Sbl is at the high logic level, the timer 68 may generate shorter pulses in the inverted blanking time signal Sbr. When the filtered voltage difference signal VHPF is less than the positive threshold voltage, it may be considered that the rising edge of the voltage difference signal Vds has not been detected, and the timer 68 may be reset without generating a pulse in the inverted blanking time signal Sbr. The clamping circuit 69 may limit the inverted blanking time signal Sbr within a predetermined range, and the inverter 218 may invert the inverted blanking time signal Sbr to generate the blanking time signal Sb.

Figure 6:
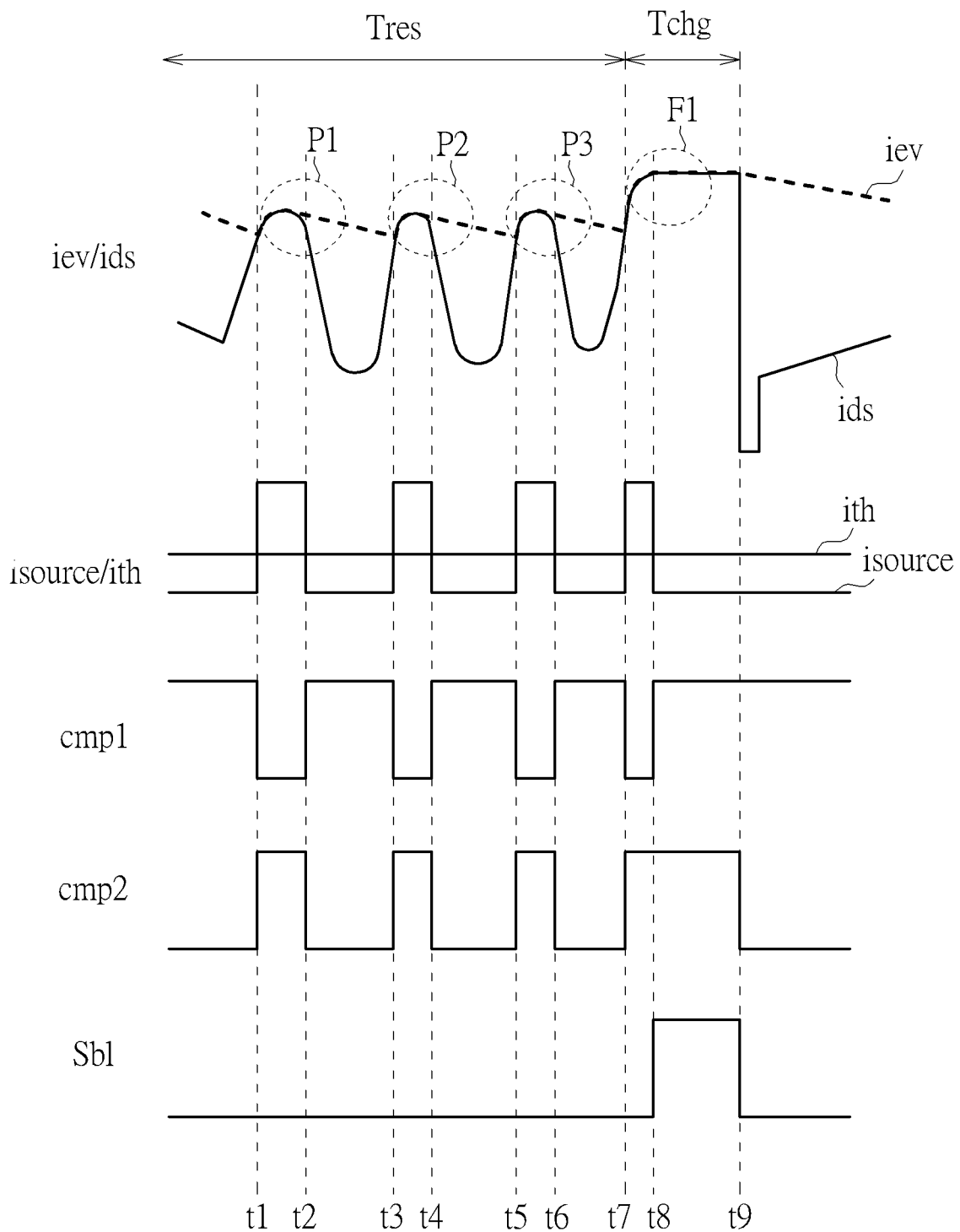
FIG. 6 shows waveforms of the blanking time circuit in FIG. 5.

FIG. 6 shows waveforms of the blanking time circuit 162 in FIG. 5, including the current ids, the envelope signal iev, the pull-up signal isource, the threshold current ith, the digital signal cmp1, the digital signal cmp2 and the time length control signal Sbl. FIG. 6 shows Time t1 to t9, in which from a time before Time t1 to Time t7 is the resonant period Tres, and between Time t7 and Time t9 is the charge period Tchg. FIG. 6 is detailed in the subsequent paragraphs with reference to the blanking time circuit 162 in FIG. 5.

Between Time t1 and Time t2, the current ids has a peak P1, the envelope signal iev is pulled up by the peak P1, the pull-up signal isource is a positive pulse and the pull-up signal isource exceeds the threshold current ith, setting the digital signal cmp1 to the low logic level; the difference between the envelope signal iev and the current ids is less than the preset difference os, setting the digital signal cmp2 to the high logic level; since the digital signal cmp1 is at the low logic level and the digital signal cmp2 is at the high logic level, the time length control signal Sbl is set to the low logic level. Between Time t2 and Time t3, the current ids starts to decrease, the envelope signal iev starts to decrease after being pulled up to the peak P1 between Time t1 and t2, the pull-up signal isource is 0A and the pull-up signal isource is less than the threshold current ith, setting the digital signal cmp1 to the high logic level; the difference between the envelope signal iev and the current ids exceeds the preset difference os, setting the digital signal cmp2 to the low logic level; since the digital signal cmp1 is at the high logic level and the digital signal cmp2 is at the low logic level, so the time length control signal Sbl remains at the low logic level, so that the timer 68 may generate longer pulses in the inverted blanking time signal Sbr.

The period from Time t3 to Time t7 corresponds to the 2nd to 3rd peaks and troughs of the resonant period. The operation of the blanking time circuit 162 is the same as that for the first peak and trough period from t1 to t3, and the explanation therefor will not be repeated for brevity.

Between Time t7 and Time t8, the current ids is pulled up again to form another peak, and the envelope signal iev is also pulled up. However, when the resonance rises for the fourth time and is about to reach the fourth peak, the charge period Tchg starts. The voltage difference signal Vds is quickly pulled up from the voltage level close to the resonance peak P3 for a short period of time to reach the Vds peak F1 when the synchronous rectifier switch Ssr is turned off, and the envelope signal iev is pulled up accordingly. the envelope signal iev is pulled up by the peak P1, the pull-up signal isource has a positive pulse and the pull-up signal isource exceeds the threshold current ith, setting the digital signal cmp1 to the low logic level. The difference between the envelope signal iev and the current ids is less than the preset difference os, setting the digital signal cmp2 to the high logic level. Since the digital signal cmp1 is at the low logic level and the digital signal cmp2 is at the high logic level, the time length control signal Sbl is set to the low logic level.

Between Time t8 and Time t9, the current ids remains unchanged, the envelope signal iev remains unchanged, the pull-up signal isource is OA and the pull-up signal isource is less than the threshold current ith, setting the digital signal cmp1 to the high logic level. The difference between the envelope signal iev and the current ids is less than the preset difference os, setting the digital signal cmp2 to the low logic level. Since the digital signal cmp1 is at the high logic level and the digital signal cmp2 is at the low logic level, the time length control signal Sbl remains at the low logic level, and the timer 68 may generate longer pulses in the inverted blanking time signal Sbr.

Figure 7:
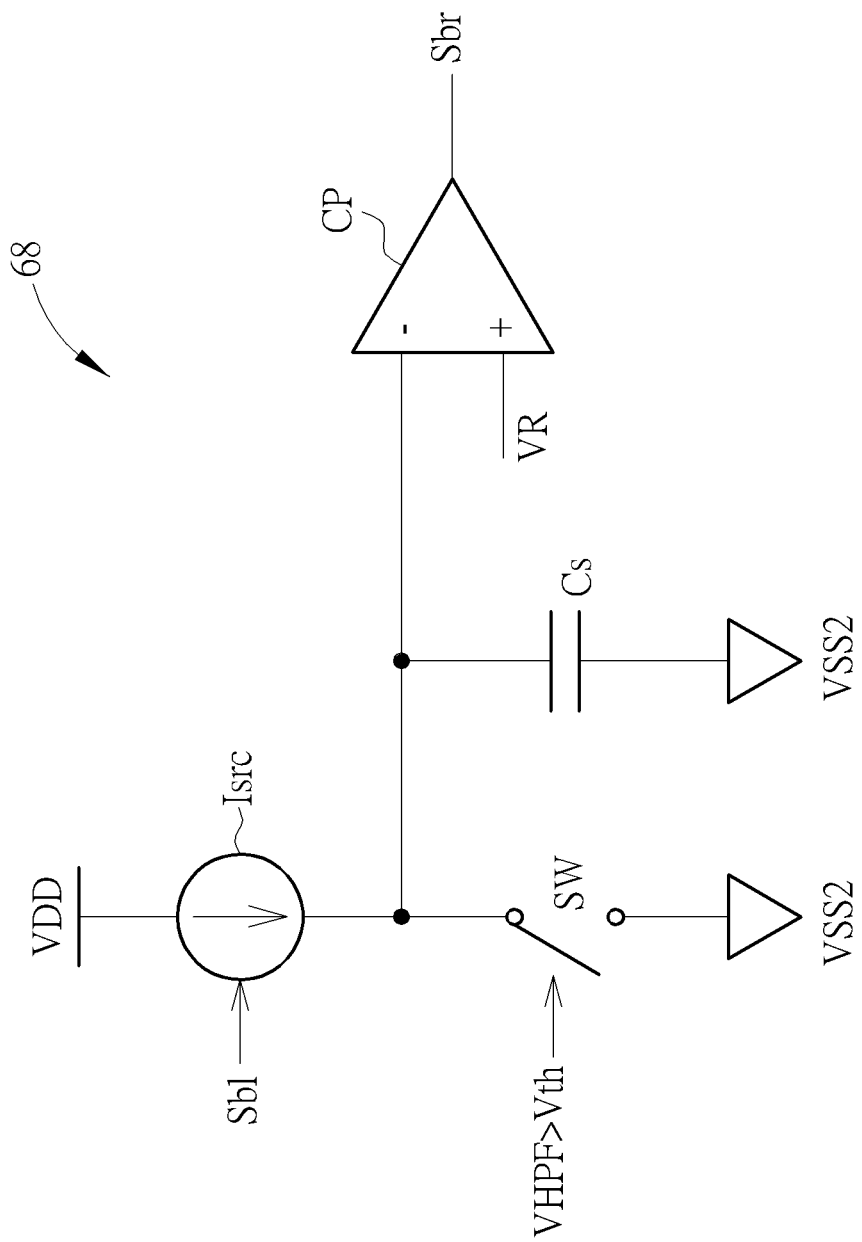
FIG. 7 is a circuit schematic of the timer in FIG. 5.

FIG. 7 is a circuit schematic of the timer 68. The timer 68 receives the time length control signal Sbl for timing and generates the inverted blanking time signal Sbr. The timer 68 includes an adjustable current source Isrc, a switching device SW, a capacitor Cs and a comparator CP. The adjustable current source Isrc includes a first terminal coupled to the supply terminal VDD; a second terminal; and a control terminal configured to receive the time length control signal Sbl. The switch device SW includes a first terminal coupled to the second terminal of the adjustable current source Isrc; a second terminal coupled to the ground terminal VSS2; and a control terminal configured to receive a comparison result of the filtered voltage difference signal VHPF and a threshold voltage Vth.

The capacitor Cs includes a first terminal coupled to the second terminal of the adjustable current source Isrc; and a second terminal coupled to the ground terminal VSS2. The comparator CP may include an inverting input terminal coupled to the first terminal of the switching device SW and the first terminal of the capacitor Cs, a non-inverting input terminal configured to receive the reference potential VR, and an output terminal configured to generate pulses in the inverted blanking time signal Sbr. The switch device SW may be realized by a transistor. The capacitor Cs may be realized by a transistor or a discrete component. The reference voltage VR may be a predetermined voltage level.

The adjustable current source Isrc may provide a charging current according to the time length control signal Sbl. When the time length control signal Sbl is at the low logic level, the adjustable current source Isrc may provide a base charging current. When the time length control signal Sbl is at the high logic level, the adjustable current source Isrc may provide an enhanced charging current, the enhanced charging current exceeding the base charging current. The switch device SW may reset the timer 68 according to the comparison result of the filtered voltage difference signal VHPF and the threshold voltage Vth. When the comparison result shows that the filtered voltage difference signal VHPF exceeds the threshold voltage Vth, the switching device SW may be turned off, and the charging current of the adjustable current source Isrc charges the capacitor Cs to gradually increase the voltage across the capacitor Cs. The comparator CP may compare the voltage across the capacitor Cs to the reference potential VR to generate a pulse in the inverted blanking time signal Sbr. When the voltage across the capacitor Cs is lower than the reference potential VR, the comparator CP is triggered to output the high logic level, generating a pulse in the inverted blanking time signal Sbr. A long time will be needed for the base charging current to charge the capacitor Cs to generate the voltage across the capacitor Cs to exceed the reference potential VR, resulting in a longer pulse in the inverted blanking time signal Sbr. A shorter time will be needed for the enhanced charging current to charge the capacitor Cs to generate the voltage across the capacitor Cs to exceed the reference potential VR, resulting in a shorter pulse in the inverted blanking time signal Sbr, the length of the shorter pulse being less than that of the longer pulse.

Figure 8:
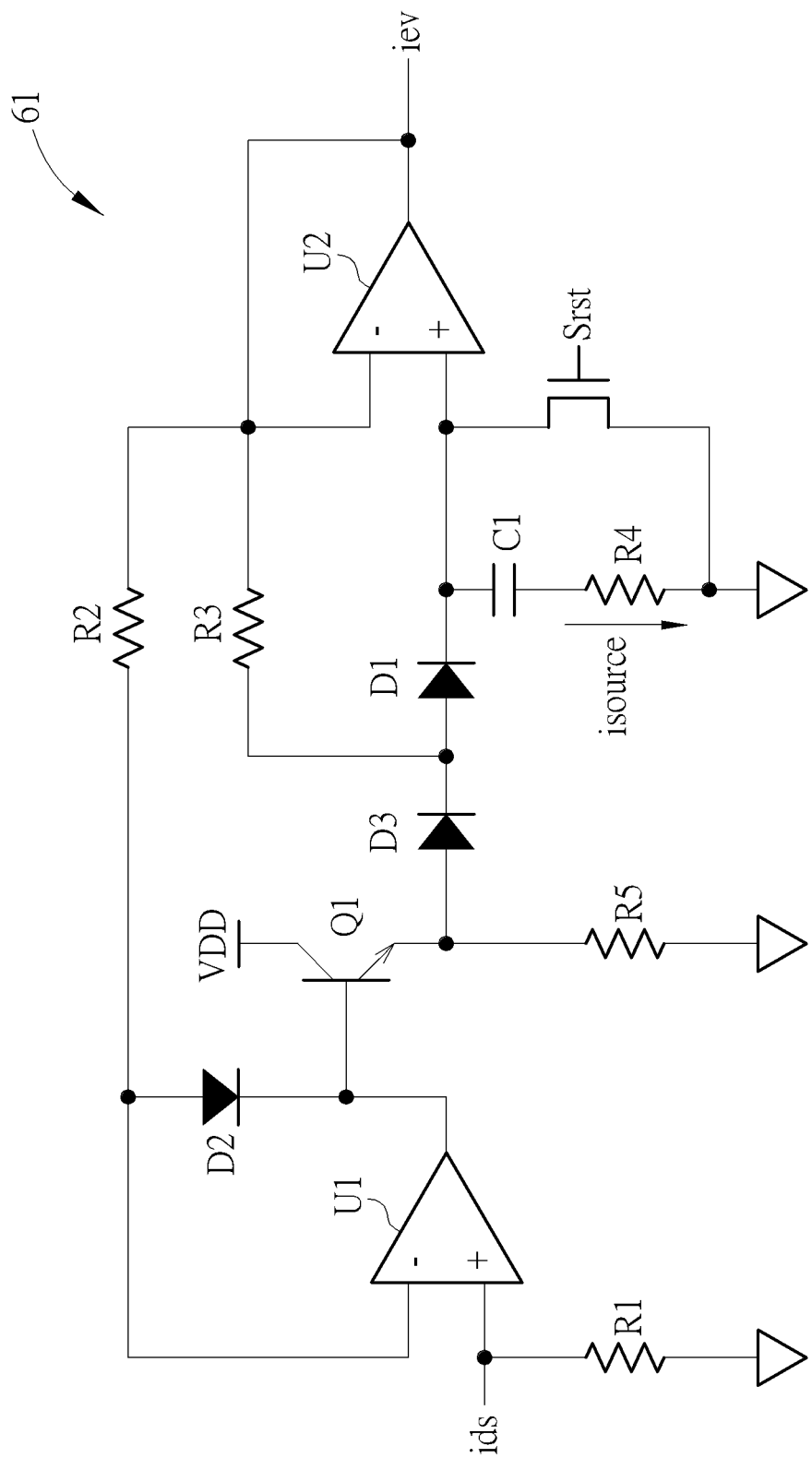
FIG. 8 is a circuit schematic of the envelope detector in FIG. 5.

FIG. 8 is a circuit schematic of the envelope detector 61. The envelope detector 61 may receive the current ids to generate the pull-up signal isource and the envelope signal iev. The envelope detector 61 includes operational amplifiers U1 and U2, diodes D1 to D3, a capacitor C1, resistors R1 to R5, a transistor Q1 and a reset switch SWr.

The operational amplifier U1 may serve as an input buffer amplifier. The diodes D1, D3 and capacitor C1 may track and store the peak of the current ids. The transistor Q1 may generate a pull-up signal isource to charge the capacitor C1. The resistor R4 may pass the current to generate the droop time. The reset switch SWr may reset the capacitor C1 according to the reset signal Srst. The pull-up signal isource may be a charging current.

In the embodiments in FIGS. 1 and 5, the flyback converter 1 may automatically adjust the turn-on condition of the synchronous rectifier switch Ssr by detecting the envelope of the current ids without using any external pin, reducing the probability of falsely turning on the synchronous rectifier switch Ssr while increasing the operating efficiency of the flyback converter 1.

Figure 9:
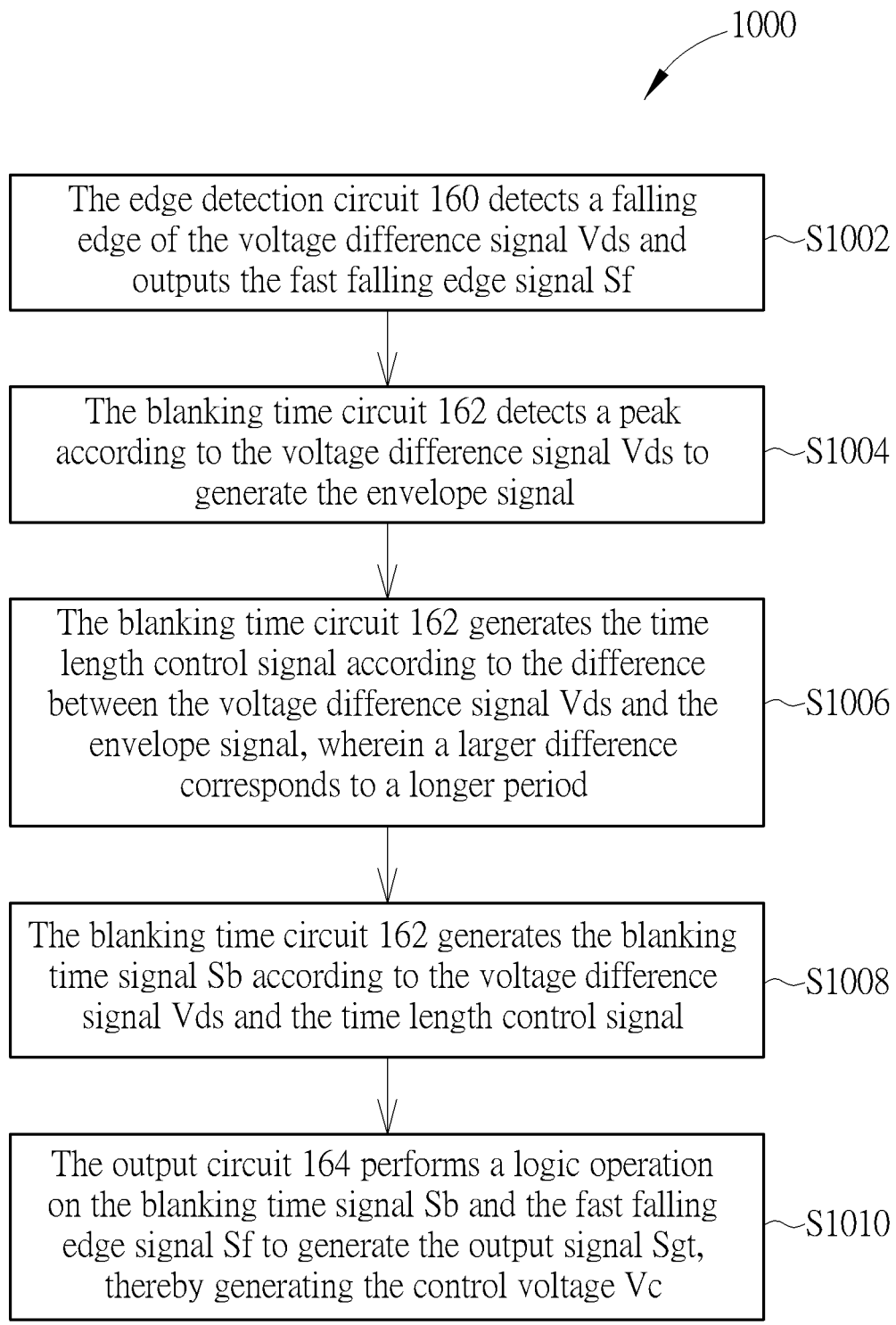
FIG. 9 is a flowchart of a method of controlling the flyback converter in FIG. 1.

FIG. 9 is a flowchart of a method 1000 of controlling the active clamp flyback converter 1. The method 1000 includes Steps S1002 to S1010 for automatically adjusting the turn-on condition of the control voltage Vc of the synchronous rectifier switch Ssr. Any reasonable step change or adjustment is within the scope of the disclosure. Steps S1002 to S1010 are detailed as follows:

Step S1002: The edge detection circuit 160 detects a falling edge of the voltage difference signal Vds and outputs the fast falling edge signal Sf;

Step S1004: The blanking time circuit 162 detects a peak according to the voltage difference signal Vds to generate the envelope signal;

Step S1006: The blanking time circuit 162 generates the time length control signal according to the difference between the voltage difference signal Vds and the envelope signal, wherein a larger difference corresponds to a longer period;

Step S1008: The blanking time circuit 162 generates the blanking time signal Sb according to the voltage difference signal Vds and the time length control signal;

Step S1010: The output circuit 164 performs a logic operation on the blanking time signal Sb and the fast falling edge signal Sf to generate the output signal Sgt, thereby generating the control voltage Vc.

The details of Steps S1002 to S1010 have been explained in the preceding paragraphs, and will not be repeated here for brevity.

In the embodiment in FIG. 9, the method 1000 of the flyback converter 1 may be used to automatically adjust the turn-on condition of the synchronous rectifier switch Ssr by detecting the envelope of the voltage difference signal Vds without using an external pin, reducing the probability of falsely turning on the synchronous rectifier switch Ssr while increasing the operating efficiency of the flyback converter 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling synchronous rectification for a flyback converter, the flyback converter comprising a transformer, a main switch, a synchronous rectifier switch and a synchronous rectifier controller, the transformer comprising a primary winding and a secondary winding, the primary winding being coupled to the main switch, the synchronous rectifier switch comprising a first terminal coupled to the secondary winding and the synchronous rectifier controller, a second terminal coupled to a power output port and the synchronous rectifier controller, and a control terminal coupled to the synchronous rectifier controller, the synchronous rectifier switch being configured to receive a control voltage from the synchronous rectifier controller to vary an impedance between the first terminal and the second terminal of the synchronous rectifier switch, a voltage difference signal being generated according to a voltage difference between the first terminal and the second terminal of the synchronous rectifier switch, the synchronous rectifier controller comprising an edge detection circuit, a blanking time circuit and an output circuit, the edge detection circuit comprises a filter and a third comparator, the method comprising:
the filter filtering the voltage difference signal to generate a filtered voltage difference signal;
the third comparator comparing the voltage difference signal with a threshold level to generate a fast falling edge signal;
the blanking time circuit detecting a peak according to the voltage difference signal to generate an envelope signal;
the blanking time circuit generating a time length control signal according to the voltage difference signal and the envelope signal;
the blanking time circuit generating a blanking time signal according to the voltage difference signal and the time length control signal; and
the output circuit performing a logic operation according to the blanking time signal and the fast falling edge signal to generate an output signal, so as to generate the control voltage.

2. The method of claim 1, wherein the blanking time circuit comprises an envelope detector, a voltage-to-current converter, a timer, and an inverter;
the blanking time circuit detecting the peak according to the voltage difference signal to generate the envelope signal comprises:
the envelope detector detecting the peak of the voltage difference signal to generate the envelope signal;
the blanking time circuit generating the time length control signal according to the voltage difference signal and the envelope signal comprises:
the voltage-to-current converter generating a difference current as the time length control signal according to a difference between the envelope signal and the voltage difference signal; and
the blanking time circuit generating the blanking time signal according to the voltage difference signal and the time length control signal comprises:
when the filtered voltage difference signal exceeds a threshold voltage, the timer generating an inverted blanking time signal according to the time length control signal; and
the inverter inverting the inverted blanking time signal to generate the time length control signal.

3. The method of claim 2, wherein the blanking time circuit further comprises a clamping circuit; and
the blanking time circuit generating the blanking time signal according to the voltage difference signal and the time length control signal further comprises:
the clamping circuit limiting the inverted blanking time signal to be within a predetermined range.

4. The method of claim 1, wherein the blanking time circuit comprises a voltage-to-current converter, an envelope detector, a first comparator, a second comparator, an AND gate, a timer, and an inverter;
the blanking time circuit detecting the peak according to the voltage difference signal to generate the envelope signal comprises:
the voltage-to-current converter converting the voltage difference signal into a flowing current; and
the envelope detector detecting the peak of the flowing current to generate a pull-up signal and the envelope signal;
the blanking time circuit generating the time length control signal according to the voltage difference signal and the envelope signal comprises:
the first comparator comparing the pull-up signal with a threshold current to generate a first digital signal;
the second comparator comparing the envelope signal with the flowing current to generate a second digital signal; and
the AND gate performing an AND operation on the first digital signal and the second digital signal to generate the time length control signal; and
the blanking time circuit generating the blanking time signal according to the voltage difference signal and the time length control signal comprises:
when the filtered voltage difference signal exceeds a threshold voltage, the timer generating an inverted blanking time signal according to the time length control signal; and
the inverter inverting the inverted blanking time signal to generate the blanking time signal.

5. The method of claim 4, wherein:
the first comparator comparing the pull-up signal with the threshold current to generate the first digital signal comprises:
when the pull-up signal is less than the threshold current, the first comparator enabling the first digital signal; and
the second comparator comparing the envelope signal with the flowing current to generate the second digital signal comprises:
when a difference between the envelope signal and the flowing current is less than a predetermined difference, the second comparator enabling the second digital signal.

6. The method of claim 4, wherein the blanking time circuit further comprises a clamping circuit;
the blanking time circuit generating the blanking time signal according to the voltage difference signal and the time length control signal further comprises:

the clamping circuit limiting the inverted blanking time signal to be within a predetermined range.

7. The method of claim 1, further comprising adjusting the filter until the fast falling edge signal is detected upon power-up.

8. The method of claim 1, further comprising adjusting the threshold level until the fast falling edge signal is detected upon power-up.

9. The method of claim 1, wherein the output circuit performing the logic operation according to the blanking time signal and the fast falling edge signal is:
the output circuit generating the output signal according to the fast falling edge signal when the blanking time signal is disabled.

10. A flyback converter comprising:
a transformer comprising:
a primary winding comprising a first terminal configured to receive an input signal, and a second terminal; and
a secondary winding comprising a first terminal and a second terminal;
a main switch coupled to the second terminal of the primary winding;
a synchronous rectifier switch comprising a first terminal coupled to the second terminal of the secondary winding and a synchronous rectifier controller,
a second terminal coupled to a power output port and the synchronous rectifier controller, and a control terminal coupled to the synchronous rectifier controller, and configured to receive a control voltage to generate an output voltage; and
the synchronous rectifier controller comprising:
an edge detection circuit coupled to the first terminal of the synchronous rectifier switch, and configured to detect a fast falling edge of a voltage difference signal representing a voltage difference between the first terminal and the second terminal of the synchronous rectifier switch to generate a fast falling edge signal, the edge detection circuit comprising:
a filter coupled to the first terminal of the synchronous rectifier switch, and configured to filter the voltage difference signal to generate a filtered voltage difference signal; and
a third comparator coupled to the filter, and configured to compare the voltage difference signal with a threshold level to generate the fast falling edge signal;
a blanking time circuit coupled to the first terminal of the synchronous rectifier switch, and configured to detect a peak according to the voltage difference signal to generate an envelope signal, generate a time length control signal according to the voltage difference signal and the envelope signal, and generate a blanking time signal according to the voltage difference signal and the time length control signal, the time length control signal indicating that a difference between the envelope signal and the voltage difference signal exceeds a predetermined threshold; and
an output circuit coupled to the edge detection circuit and the blanking time circuit, and configured to perform a logic operation according to the blanking time signal and the fast falling edge signal to generate an output signal, so as to generate the control voltage.

11. The flyback converter of claim 10, wherein the blanking time circuit comprises:

an envelope detector coupled to the first terminal of the synchronous rectifier switch, and configured to detect the peak of the voltage difference signal to generate the envelope signal;
a voltage-to-current converter coupled to the envelope detector, and configured to generate a difference current as the time length control signal according to a difference between the envelope signal and the voltage difference signal;
a timer coupled to the filter and the voltage-to-current converter, and configured to generate an inverted blanking time according to the time length control signal when the filtered voltage difference signal exceeds a threshold voltage; and
an inverter coupled to the timer and configured to invert the inverted blanking time signal to generate the blanking time signal.

12. The flyback converter of claim 11, wherein the blanking time circuit further comprises a clamping circuit coupled to the timer and the inverter, and configured to limit the inverted blank-time signal to be within a predetermined range.

13. The flyback converter of claim 10, wherein the blanking time circuit comprises:
a voltage-to-current converter coupled to the first terminal of the synchronous rectifier switch, and configured to convert the voltage difference signal into a flowing current;
an envelope detector coupled to the voltage-to-current converter, and configured to detect the peak of the flowing current to generate a pull-up signal and the envelope signal;
a first comparator coupled to the envelope detector and configured to compare the pull-up signal with a threshold current to generate a first digital signal;
a second comparator coupled to the envelope detector and configured to compare the envelope signal with the flowing current to generate a second digital signal;
an AND gate coupled to the first comparator and the second comparator, and configured to perform an AND operation on the first digital signal and the second digital signal to generate the time length control signal;
a timer coupled to the filter and the AND gate, and configured to generate an inverted blanking time signal according to the time length control signal when the filtered voltage difference signal exceeds a threshold voltage; and
an inverter coupled to the timer and configured to invert the inverted blanking time signal to generate the blanking time signal.

14. The flyback converter of claim 13, wherein:
when the pull-up signal is less than the threshold current, the first comparator is configured to enable the first digital signal; and
when a difference between the envelope signal and the flowing current is less than a predetermined difference, the second comparator enables the second digital signal.

15. The flyback converter of claim 13, wherein the blanking time circuit further comprises a clamping circuit coupled to the timer and the inverter, and configured to limit the inverted blank-time signal to be within a predetermined range.

16. The flyback converter of claim 10, wherein the output circuit is configured to generate the output signal according to the fast falling edge signal when the blanking time signal is disabled.

* * * * *